United States Patent [19]

Hubbard et al.

[11] 4,373,099
[45] Feb. 8, 1983

[54] CONTINUOUS PROCESS FOR PREPARATION OF A THINNED CATIONIC STARCH PASTE

[75] Inventors: E. Daniel Hubbard, West Liberty; Richard D. Harvey, Muscatine, both of Iowa

[73] Assignee: Grain Processing Corporation, Muscatine, Iowa

[21] Appl. No.: 309,268

[22] Filed: Oct. 7, 1981

[51] Int. Cl.³ .................. C08B 31/00; C08B 31/18
[52] U.S. Cl. ........................ 536/105; 106/210; 536/45; 536/47; 536/50; 536/102; 536/106
[58] Field of Search ............ 536/102, 105, 106, 50, 536/47, 45; 106/210

[56] References Cited

U.S. PATENT DOCUMENTS

| | | | |
|---|---|---|---|
| 2,053,012 | 9/1936 | Meulen | 106/210 |
| 2,076,889 | 4/1937 | Hees | 536/102 |
| 2,173,041 | 9/1939 | Müller | 536/105 |
| 2,204,615 | 6/1940 | Nivling | 536/105 |
| 2,876,217 | 3/1959 | Paschall | 536/50 |
| 2,995,513 | 8/1961 | Paschall et al. | 210/731 |
| 3,211,564 | 10/1965 | Lauterbach | 106/214 |
| 3,346,563 | 10/1967 | Shildneck et al. | 536/50 |
| 3,475,215 | 10/1969 | Mawer | 127/36 |
| 3,539,366 | 11/1970 | Ewing | 106/213 |
| 3,598,622 | 8/1971 | Maher et al. | 106/210 |
| 3,622,563 | 11/1971 | Elizer | 106/210 |
| 3,637,656 | 1/1972 | Germino et al. | 536/50 |
| 3,649,616 | 3/1972 | Goldstein et al. | 536/50 |
| 3,674,725 | 7/1972 | Aitken et al. | 106/210 |
| 3,721,575 | 3/1973 | Varawenko | 106/213 |
| 3,770,472 | 11/1973 | Varowenko | 106/213 |
| 3,854,970 | 12/1974 | Aitken | 106/210 |
| 3,912,715 | 10/1975 | Varowenko | 536/45 |
| 4,040,862 | 8/1977 | Voigt et al. | 106/210 |
| 4,097,427 | 6/1978 | Aitken et al. | 527/312 |

FOREIGN PATENT DOCUMENTS 167010 1/1977 Czechoslovakia .
2055046 8/1978 Fed. Rep. of Germany .

*Primary Examiner*—Ronald W. Griffin
*Attorney, Agent, or Firm*—Neuman, Williams, Anderson & Olson

[57] ABSTRACT

A process whereby a gelatinized starch having a cationic reagent chemically bound to the starch backbone and a reduced viscosity is prepared by (1) gelatinizing starch and substantially simultaneous with gelatinization reacting said treated starch with an alkyl or alkenyl amine and a water soluble oxidant or (2) simultaneously reacting an alkyl or alkenyl amine and a water soluble oxidant with a gelatinized starch. The process is conducive to the on-site preparation of a thinned cationic starch derivative which can be utilized without additional treatment as a papermaking additive, textile size, waste water treatment, tailing flocculent, etc.

24 Claims, No Drawings

CONTINUOUS PROCESS FOR PREPARATION OF A THINNED CATIONIC STARCH PASTE

This invention relates to the preparation of a thinned cationic starch. More specifically, this invention relates to processes for the on-site preparation of cationic starch pastes for use in papermaking, textile size, waste water treatment, etc. without additional treatment.

Cationic starches are widely used as wet end additives in the papermaking process to improve fines and filler retention while increasing the strength characteristics of the resultant paper. A smaller, but no less important, papermaking application is in the size press and coating areas where cationic starches contribute to the strength and surface characteristics of the finished paper and, in addition, reduce the biological oxygen demand (BOD) contribution of the broke upon repulping.

Cationic starches are almost exclusively marketed as dry, granular, ungelatinized products. In use, the cationic starches must be reslurried in water and then gelatinized to produce a thoroughly dispersed cationic starch paste.

Granular cationic starches are generally prepared by reacting an alkaline (pH 11-12) starch slurry with a cationic reagent in the presence of a gelatinization inhibitor such as sodium chloride, sodium sulfate, etc. and at a temperature below the gelatinization temperature of the starch. Reaction times are characteristically 12 to 20 hours. Additional operations, i.e. acid-modification, oxidation, etc., may be included in the process as required to obtain a product designed for a specific application. The addition of subsequent operations, however, further complicates the process and results in even greater processing (reaction) times. In any event, the reaction slurry must be adjusted to a more neutral pH and then washed to remove the gelatinization inhibiting salts.

These basic procedures, though widely used, entail certain problems. Thus, granule state reactions in aqueous slurries require the addition of gelatinization inhibitors to prevent granule swelling. Because of the need to maintain the starch in granular form, reaction temperatures must be low (less than about 50° C.) to guard against gelatinization. Low reaction temperatures result in long reaction times, such as 12 hours or more. The resultant highly alkaline reaction slurries must be neutralized and the added gelatinization inhibiting salts removed by washing before drying. The washing operations, however, result in significant losses of starch (especially the more highly derivatized portion), contributing not only to reduced product yields but also to increased biological oxygen demand (BOD) and suspended solids loads in the waste water streams. The preparation of low viscosity, granular, starch derivatives by superimposing a viscosity reducing operation—such as acid-modification, oxidation, etc.—either prior to or after cationization, accentuates the solubles loss problem still further resulting in even greater BOD loadings.

In addition, the variety of cationic starches commercially available suggests the products are intended for specific use areas and problems. Specialized starches of this type tend to be relatively low volume products and hence must command premium prices which further restrict their usage. This specialization creates inventory problems for the user due to the warehousing of a variety of different cationic starches to meet various requirements.

It was heretofore believed that the simultaneous reaction of a water soluble oxidant and a cationizing reagent with starch resulted in reduced cationization reaction efficiencies. Results, summarized in Examples I and II, show that granule state reactions of starch with halogenated alkyl amines, such as 2-diethylaminoethyl chloride hydrochloride (DEAE) or 3-chloro-2-hydroxypropyltrimethylammonium chloride (CHPTA), are inhibited by the inclusion of water soluble oxidants—such as ammonium persulfate (AP) and hydrogen peroxide. A third common water soluble oxidant—alkaline sodium hypochlorite (NaOCl)—appears to be a special case. When combined with 3-chloro-2-hydroxypropyltrimethylammonium chloride in a granular starch reaction reduced efficiencies were noted (Example III); no inhibition was noted, however, when 2-diethylaminoethyl chloride hydrochloride was substituted for 3-chloro-2-hydroxypropyltrimethylammonium chloride.

We have, however, discovered that starch cationization can be conducted in the pasted state simultaneously with starch oxidation using a water-soluble oxidant with little or no reduction in cationization reaction efficiency. Thus, the present invention relates to the preparation of a cationic starch paste. More specifically, this invention relates to processes for the preparation of thinned, cationic starch pastes by a one-step process utilizing a single starch feed stock.

The products obtained by such a process can be used in papermaking, textile sizing, waste water treatment applications and so forth without additional processing.

Basically the processes of this invention comprise:
(1) forming an aqueous starch slurry wherein the starch is present in a concentration of 3-40%, preferably 10-40%, by weight;
(2) treating said starch slurry—either continuously or batchwise—with
   (a) a monomeric halogenated alkyl or alkenyl amine such as 2-diethylaminoethyl chloride hydrochloride (DEAE) or 4-chloro-2-butenyltrimethylammonium chloride (CBTC). A particularly preferred cationic reagent is the product obtained by reacting epichlorohydrin with trimethylamine or one of its salts, said reaction product being substantially free of residual epichlorohydrin and consisting substantially of 3-chloro-2-hydroxypropyltrimethylammonium chloride (CHPTA), and
   (b) a water soluble oxidant such as ammonium, sodium and potassium persulfate or sodium hypochlorite; and
(3) pumping said treating starch slurry to a steam jet or other suitable heating device and heating said starch slurry-cationic reagent-water soluble oxidant mixture to gelatinize the starch and substantially simultaneously with the gelatinization reacting with the said mixture from about 1 to 15 equivalent weights of a base per mole of cationic monomeric halogenated alkyl or alkenyl amine at a temperature of from 120° F. to 350° F. and preferably at a temperature of from 120° F. to 200° F. for a period of up to two hours.

Alternatively, a high solids starch slurry is thermalchemically converted or pasted and subsequently treated with an alkali or base, a water soluble oxidant and the cationic reagent. Basically, the processes of this alternative procedure comprise:

(1) forming an aqueous starch slurry wherein the starch is present in a concentration of 3–40% and preferably 10–40% by weight,
(2) pasting said treated starch slurry using any one of a variety of procedures, i.e., live steam injection into the slurry, external heat application to the slurry, autoclaving, jet cooking or thermal-chemical conversion as described in U.S. Pat. No. 3,211,564,
(3) treating said pasted starch with
   (a) 1–15 equivalent weights of a base per mole of cationic reagent,
   (b) a water soluble oxidant, and
   (c) the monomeric cationic reagent, and
(4) reacting said treated starch paste at a temperature of from 120° F. to 350° F. and preferably at a temperature of from 120° F. to 200° F. for a period of up to two hours.

The term dispersion or pasted is commonly used in the art and refers to an aqueous starch suspension which has been hydrated or gelatinized by any of a number of means known to those skilled in the art.

Any of the commonly used starches can be used in carrying out this invention. Examples of suitable starches include corn, wheat, rice, tapioca, potato and sago starches as well as starches which have been premodified by various means such as acid modification, oxidation, derivatization and the like.

Alkali or base as used herein applies primarily to sodium hydroxide, however, other alkalies, bases or alkaline salts such as potassium hydroxide, calcium hydroxide or oxide, sodium carbonate, trisodium phosphate, morpholine, etc. can also be used.

Water soluble oxidant as used herein applies primarily to ammonium persulfate; however, other water soluble oxidants, such as sodium or potassium persulfates, hydrogen peroxide and alkaline hypochlorites, such as sodium hypochlorite, can also be used.

Examples I–III demonstrate the inhibitory effect of the presence of conventional oxidants on the starch cationization reaction efficiency in granule state reactions.

EXAMPLE I

Aqueous 40% dry solids starch slurries were prepared using unmodified corn starch and distilled water and then warmed to about 120° F. in a water bath. The starch slurry was then treated with a cationizing reagent and varying amounts of a caustic/brine solution. The caustic/brine solution was prepared using varying amounts (see Table I) of aqueous (1) 30% sodium hydroxide and (2) 26% sodium chloride (both wt/wt) and then carefully added to the well-agitated slurries. Shortly after the caustic/brine addition ammonium persulfate was added and the reaction allowed to continue overnight with agitation at 120° F.

At the end of the reaction period the slurries were tested for residual oxidant—with negative results—and then adjusted to pH 5.5–6 using dilute hydrochloric acid. The neutralized slurries were filtered on a Buchner funnel and the wet cake washed, on the funnel, with one-half volume of warm tap water before drying in a forced draft oven. The resultant dry products were analyzed for:

1. Nitrogen using the Kjeldahl procedure. The nitrogen value can be used to calculate the (a) degree of substitution (DS) and (b) reaction efficiency.
2. Alkali fluidity using the procedure of Fetzer and Kirst; Cereal Chemistry, 36, 108–127 (1959). The alkali fluidity value is a measure of the viscosity (fluidity) of a starch past—the higher the alkali fluidity value, the lower the viscosity of the starch paste.

TABLE I

| Sample No. | NaOH (% dsb*) | NaCl (% dsb) | Cationic Reagent % As Is on Starch ds** | AP[3] % As Is on Starch ds | Alkali Fluidity ml (9 g dsb) | Nitrogen Results DS | Reaction Efficiency (%) |
|---|---|---|---|---|---|---|---|
| CHPTA[1] | | | | | | | |
| 1a | 2.0 | 7.9 | 5.0 | 0 | 28 | 0.0282 | 65 |
| 1b | 2.25 | 9.0 | 5.0 | 0.5 | 28 | 0.0191 | 44 |
| DEAE[2] | | | | | | | |
| 2a | 2.0 | 9.0 | 4.58 | 0 | 26 | 0.0332 | 77 |
| 2b | 2.2 | 9.0 | 4.58 | 0.5 | 28 | 0.0181 | 42 |

*Dry starch basis
**Dry solids
[1] 3-chloro-2-hydroxypropyltrimethylammonium chloride
[2] 2-diethylaminoethyl chloride hydrochloride
[3] ammonium persulfate Results, summarized in Table I, show that the addition of ammonium persulfate inhibits the granule state reaction of starch with (1) 3-chloro-2-hydroxypropyltrimethylammonium chloride and (2) 2-diethylaminoethyl chloride hydrochloride as evidenced by reduced reaction efficiencies.

Alkali fluidity results show that the addition of ammonium persulfate had no effect on paste viscosities.

EXAMPLE II

A series of granular cationic starches was prepared using the general reaction conditions described in Example I and hydrogen peroxide in place of the aforementioned ammonium persulfate. Reaction conditions are summarized in Table II.

TABLE II

| Sample No. | NaOH (% dsb) | NaCl (% dsb) | Cationic Reagent % As Is on Starch ds | Hydrogen Peroxide % Active on Starch ds | Alkali Fluidity ml (9 g dsb) | Nitrogen Results DS | Reaction Efficiency (%) |
|---|---|---|---|---|---|---|---|
| CHPTA | | | | | | | |
| 1a | 2.0 | 9.0 | 5.0 | 0 | 26 | 0.0288 | 67 |
| 1b | 2.0 | 9.0 | 5.0 | 0.5 | 32 | 0.0075 | 17 |
| DEAE | | | | | | | |
| 2a | 2.0 | 9.0 | 4.58 | 0 | 26 | 0.0332 | 77 |
| 2b | 2.4 | 6.4 | 4.58 | 0.5 | 29 | 0.0222 | 51 |

Reaction efficiency data, summarized in Table II, show that the addition of hydrogen peroxide inhibits the granule state reaction of starch with (1) 3-chloro-2-hydroxypropyltrimethylammonium chloride or (2) 2-diethylaminoethyl chloride hydrochloride. Alkali fluidity results show no significant change in the viscosity of the starch.

EXAMPLE III

A series of granular cationic starches was prepared using the general reaction conditions described in Example I except:

(1) Sodium hypochlorite (NaOCl) was substituted for the previously used ammonium persulfate, and
(2) Unlike the previous examples, residual oxidant was detected at the end of the reaction period. The remaining oxidant was consumed by the addition of a small amount of sodium bisulfite before proceeding with the slurry neutralization step.

Reaction details are summarized in Table III.

TABLE III

| Sample No. | NaOH (% dsb) | NaCl (% dsb) | Cationic Reagent % As Is on Starch ds | NaOCl % Active Chlorine on Starch ds | Alkali Fluidity ml (9 g dsb) | Nitrogen Results DS | Reaction Efficiency (%) |
|---|---|---|---|---|---|---|---|
| CHPTA | | | | | | | |
| 1a | 2.0 | 7.9 | 5.0 | 0 | 28 | 0.0282 | 65 |
| 1b | 2.81 | 7.9 | 5.0 | 1.7 | 117 | 0.0221 | 51 |
| DEAE | | | | | | | |
| 2a | 2.0 | 9.0 | 4.58 | 0 | 26 | 0.0332 | 77 |
| 2b | 2.4 | 6.6 | 4.58 | 1.7 | 160 | 0.0340 | 79 |

Results, summarized in Table III, show that:

(1) The 3-chloro-2-hydroxypropyltrimethylammonium chloride—granular starch reaction was inhibited by the addition of sodium hypochlorite.
(2) The 2-diethylaminoethyl chloride hydrochloride—granular starch reaction was not affected by the addition of sodium hypochlorite. This particular combination of cationic reagent and oxidant appears to be an exception.
(3) In both cases—i.e., 3-chloro-2-hydroxypropyltrimethylammonium chloride and 2-diethylaminoethyl chloride—the sodium hypochlorite did thin the starch. The degree of hydrolysis was greatest with the 2-diethylaminoethyl chloride hydrochloride preparation.

EXAMPLE IV

An aqueous 30% starch dry solids slurry was prepared using a 25 Buel fluidity acid-modified corn starch, 5% active 3-chloro-2-hydroxypropyltrimethylammonium chloride (by weight on starch dry solids) and varying amounts of ammonium persulfate. The resultant slurry was continuously thermally-chemically converted using a steam jet and the following conditions.

| | |
|---|---|
| Sodium Hydroxide: | 3.8% sodium hydroxide on starch dry solids added, as a solution, just before the steam jet. |
| Reaction Temperature: | 180° F. |
| Reaction time: | Approximately 15 minutes. |

Portions of the resultant paste were immediately neutralized to pH 5-7, thereby terminating the reaction, and then precipitated in and washed with methanol to remove the soluble nitrogen containing materials. The resultant wet cake was dried for Kjeldahl nitrogen determination.

Results, summarized in Table IV, show that the reaction of (1) 3-chloro-2-hydroxypropyltrimethylammonium chloride and (2) ammonium persulfate with an alkaline starch paste can be conducted simultaneously with no loss in the cationization reaction efficiency. Reaction efficiencies were approximately 64-65% regardless of the ammonium persulfate use level (0–0.49% ammonium persulfate on starch dry solids). The results also show that the ammonium persulfate did hydrolyze the starch as evidenced by the decrease in paste viscosity with increasing ammonium persulfate usage.

TABLE IV

| Sample No. | AP % dsb | Nitrogen Results % dsb | DS | Reaction Efficiency (%) | Dry Solids (%) | Paste Viscosity at 150° F. Brookfield (cp) at 50 rpm |
|---|---|---|---|---|---|---|
| Underivatized Control | | 0.0519 | — | — | — | — |
| 1 | 0 | 0.2893 | 0.0282 | 65 | 26.6 | 35500 |
| 2 | 0.36 | 0.2845 | 0.0276 | 64 | 27.6 | 14320 |
| 3 | 0.49 | 0.2886 | 0.0281 | 65 | 26.9 | 5320 |

EXAMPLE V

An aqueous 30% dry solids unmodified starch slurry was mixed with 5% active 3-chloro-2-hydroxypropyltrimethylammonium chloride (by weight on starch dry solids) and varying amounts of ammonium persulfate. The resultant slurry was continuously thermally-chemically converted in a steam jet using the following conditions.

| | |
|---|---|
| Sodium Hydroxide: | 4.05% sodium hydroxide on starch dry solids added, as solution, just before the steam jet. |
| Reaction Temperature: | 180° F. |
| Reaction Time: | Approximately 15 minutes. |

The resultant paste samples were prepared for assay as described in Example IV.

A second portion of the original alkaline paste was diluted to various solids levels, mixed thoroughly and then placed in a 150° F. bath for subsequent viscosity measurements.

The data summarized in Table V show that (1) the addition of up to 0.93% ammonium persulfate (as is on dry starch) had no effect on the cationization reaction efficiency and (2) ammonium persulfate did thin the starch paste. The extent of viscosity reduction was directly related to the ammonium persulfate use level. In addition, the results in Examples IV and V show that various types of corn starch, i.e., unmodified or acid-modified, can be used interchangeably with no effect on the cationization reaction efficiency.

TABLE V

| Sample No. | AP % dsb | Nitrogen Results % dsb | DS | Reaction Efficiency (%) | Paste Dry Solids (%) | Viscosity at 150° F. Brookfield (cp) at 50 rpm | Dudley (seconds) |
|---|---|---|---|---|---|---|---|
| Underivatized Control | | 0.0583 | | | | | |
| 1 | 0.25 | 0.2906 | 0.0275 | 64 | 26.7 | 56720 | Too Thick |
| 2 | | | | | 13.2 | 1800 | " |
| 3 | | | | | 7.3 | 304 | " |
| 4 | 0.48 | 0.3030 | 0.0291 | 67 | 26.9 | 12880 | Too Thick |
| 5 | | | | | 13.1 | 417 | " |
| 6 | | | | | 7.5 | 75 | 51.9 |
| 7 | 0.71 | 0.2855 | 0.0269 | 63 | 25.5 | 1640 | Too Thick |
| 8 | | | | | 12.4 | 105 | 72 |
| 9 | | | | | 7.1 | 35 | 40.5 |
| 10 | 0.93 | 0.2839 | 0.0267 | 62 | 26.1 | 1256 | Too Thick |
| 11 | | | | | 12.8 | 66 | 59.1 |
| 12 | | | | | 7.7 | 23 | 38.3 |

EXAMPLE VI

An aqueous 23% dry solids slurry of a 25 Buel fluidity, acid-modified starch was thermally converted in a steam jet using the following conditions.

| | |
|---|---|
| Conversion Temperature: | 310–315° F. |
| Pressure: | 70–80 psig. |
| Retention Time: | Approximately 5 minutes. |

The resultant paste was divided into portions, cooled in a water bath to 180° F., and then treated with sodium hydroxide, 3-chloro-2-hydroxypropyltrimethylammonium chloride and ammonium persulfate as described in Table VI. After a 30-minute reaction period, paste viscosities were determined and the samples recovered as described in Example IV.

Results, summarized in Table VI, show that:
(1) The simultaneous reaction of starch with (a) 3-chloro-2-hydroxypropyltrimethylammonium chloride and (b) ammonium persulfate can be carried out using a batch procedure (as opposed to the continuous process described in the preceding two examples) with no less in reaction efficiency.
(2) A thermally converted starch can be subsequently reacted with (a) 3-chloro-2-hydroxypropyltrimethylammonium chloride and (b) ammonium persulfate with no effect on the cationization reaction efficiency.

TABLE VI

| Sample No. | NaOH % on Starch ds | CHPTA % Active on Starch ds | Mol Ratio* | AP % dsb | Nitrogen Results % dsb | DS | Reaction Efficiency (%) | Brookfield Viscosity (cp) at 180° F. 50 rpm |
|---|---|---|---|---|---|---|---|---|
| Control | 4.44 | — | — | — | 0.0311 | — | — | 467 |
| 2 | 4.44 | 4.99 | 0.0431 | 0 | 0.2593 | 0.0269 | 62 | 395 |
| 3 | 4.44 | 4.99 | 0.0431 | 0.55 | 0.2757 | 0.0289 | 67 | 117 |

*Mols cationic reagent per anhydro-D-glucose unit

EXAMPLE VII

An aqueous 23% dry solids slurry of a 25 Buel fluidity, acid-modified starch was thermally converted in a steam jet using the following conditions:

| | |
|---|---|
| Conversion Temperature: | 310–315° F. |
| Pressure: | 70–80 psig. |
| Retention Time: | Approximately 5 minutes. |

The resultant paste was divided into portions, cooled in a water bath to 180° F. and then treated with sodium hydroxide, a cationic reagent and ammonium persulfate as described in Table VII. After a 30-minute reaction period, paste viscosities were determined and the samples recovered as described in Example IV.

Results, summarized in Table VII, show the efficiency of the starch (1) 3-chloro-2-hydroxypropyltrimethylammonium chloride, (2) 2-diethylaminoethyl chloride hydrochloride or (3) 4-chloro-2-butenyltrimethylammonium chloride reaction, using the batch on-site technology, is not adversely affected by the addition of ammonium persulfate.

-continued persulfate.

The resultant pastes were each divided into three 800-gram portions, cooled to 180° F. in a water bath and treated with sodium hydroxide, 3-chloro-2-hydroxypropyltrimethylammonium chloride and ammonium persulfate as noted in Table VIII. After a 30-minute reaction period, paste viscosities were determined and

TABLE VII

| Sample No. | NaOH % on Starch ds | Cationic Reagent Type | % Active on Starch ds | Mol Ratio | AP % dsb | Nitrogen Results % dsb | DS | Reaction Efficiency (%) | Brookfield Viscosity (cp) at 150° F. 50 rpm |
|---|---|---|---|---|---|---|---|---|---|
| Control | 4.44 | — | — | — | — | 0.0311 | — | — | 467 |
| 2 | 4.44 | CHPTA[1] | 4.99 | 0.0431 | 0 | 0.2593 | 0.0269 | 62 | 395 |
| 3 | 4.44 | CHPTA | 4.99 | 0.0431 | 0.55 | 0.2757 | 0.0289 | 67 | 117 |
| 4 | 4.44 | DEAE[2] | 5.08 | 0.0478 | 0 | 0.3472 | 0.0375 | 79 | 386 |
| 5 | 4.44 | DEAE | 5.08 | 0.0478 | 0.55 | 0.3455 | 0.0373 | 78 | 147 |
| 6 | 4.56 | CBTC[3] | 5.51 | 0.0485 | 0 | 0.2878 | 0.0303 | 63 | 407 |
| 7 | 4.56 | CBTC | 5.51 | 0.0485 | 0.57 | 0.2903 | 0.0307 | 63 | 123 |

[1]3-chloro-2-hydroxypropyltrimethylammonium chloride
[2]2-diethylaminoethyl chloride hydrochloride
[3]4-chloro-2-butenyltrimethylammonium chloride

EXAMPLE VIII

Aqueous, 23% dry solids slurries of various starches were (1) thermally or (2) thermal-chemically converted in a steam jet using conditions described below:

| Conversion Temperature: | 310–315° F. |
|---|---|
| Pressure: | 70–80 psig. |
| Retention Time: | Approximately 5 minutes. |
| Ammonium Persulfate: | (1) Potato, wheat, tapioca, a crosslinked corn starch, and a thick-boiling hydroxyethyl corn starch were each thermal-chemically converted using 0.03% ammonium persulfate on starch dry solids.<br>(2) A medium hypochlorite oxidized corn starch was thermally converted without added ammonium | the samples recovered as described in Example IV.

Results, summarized in Table VIII, show that a wide variety of starches can be substituted for a thermally-converted, acid-modified corn starch or thermal-chemically converted corn starch without affecting the cationization reaction efficiency. In each case the viscosity results show the ammonium persulfate did thin the starch without affecting the reaction efficiency.

TABLE VIII

| Sample No. | Starch Type | Reaction Conditions NaOH % on Starch Dry Solids | CHPTA % on Starch Dry Solids | Mol Ratio | AP % on Starch Dry Solids | Kjeldahl Nitrogen % dsb | DS | Reaction Efficiency (%) | Dry Solids (%) | Paste Viscosity Brookfield Viscosity (cp) at 50 rpm 180° F. |
|---|---|---|---|---|---|---|---|---|---|---|
| 1 | Potato | 4.53 | 0 | 0 | 0 | 0.0190 | — | — | 17.66 | 1490 |
| 2 | | 4.53 | 5.10 | 0.0439 | 0 | 0.2873 | 0.0319 | 73 | 17.66 | 1428 |
| 3 | | 4.61 | 5.18 | 0.0446 | 0.58 | 0.2890 | 0.0322 | 72 | 17.37 | 145 |
| 4 | Wheat | 4.33 | 0 | 0 | 0 | 0.0326 | — | — | 18.48 | 1120 |
| 5 | | 4.33 | 4.87 | 0.0419 | 0 | 0.3074 | 0.0327 | 78 | 18.48 | 1028 |
| 6 | | 4.33 | 4.87 | 0.0419 | 0.54 | 0.3104 | 0.0331 | 79 | 18.48 | 173 |
| 7 | Tapioca | 4.11 | 0 | 0 | 0 | 0.0100 | — | — | 19.46 | 1598 |
| 8 | | 4.11 | 4.63 | 0.0398 | 0 | 0.2628 | 0.0300 | 76 | 19.46 | 1348 |
| 9 | | 4.11 | 4.63 | 0.0398 | 0.51 | 0.2542 | 0.0290 | 73 | 19.46 | 169 |
| 10 | Medium Hypochlorite | 4.50 | 0 | 0 | 0 | 0.0095 | — | — | 17.78 | 32 |
| 11 | Oxidized Corn Starch | 4.50 | 5.06 | 0.0436 | 0 | 0.2655 | 0.0304 | 70 | 17.78 | 43 |
| 12 | | 4.72 | 5.30 | 0.0456 | 0.59 | 0.2587 | 0.0296 | 65 | 16.98 | 30 |
| 13 | Crosslinked Corn | 4.46 | 0 | 0 | 0 | 0.0373 | — | — | 17.97 | 1084 |
| 14 | Starch | 4.46 | 5.01 | 0.0431 | 0 | 0.2952 | 0.0307 | 71 | 17.97 | 902 |
| 15 | | 4.46 | 5.01 | 0.0431 | 0.56 | 0.2914 | 0.0302 | 70 | 17.97 | 179 |
| 16 | Thick-Boiling | 4.68 | 0 | 0 | 0 | 0.0237 | — | — | 17.12 | 712 |
| 17 | Hydroxyethyl Corn | 4.68 | 5.25 | 0.0453 | 0 | 0.2939 | 0.0322 | 71 | 17.12 | 718 |
| 18 | Starch | 4.68 | 5.25 | 0.0453 | 0.58 | 0.2967 | 0.0325 | 72 | 17.12 | 133 |

EXAMPLE IX

An aqueous, 30% dry solids slurry of a 25 Buel fluidity acid-modified starch was treated with (1) 5% 3-chloro-2-hydroxypropyltrimethylammonium chloride (starch dry solids basis) and (2) varying amounts of ammonium persulfate and then thermally-chemically converted in a steam jet using the following conditions:

| | |
|---|---|
| Sodium Hydroxide: | Approximately 4% on starch dry solids added, as a solution, just before the steam jet. |
| Conversion Temperature: | 175° F. and 300° F., as noted. |
| Retention Time: | Approximately 17.5 minutes. |

Results, summarized in Table IX, show that:
(1) Increasing the reaction temperature from 175° F. (79° C.) up to 300° F. (149° C.) resulted in a significant reduction in reaction efficiency.
(2) At this higher reaction temperature the use of ammonium persulfate did not further reduce the reaction efficiency.
(3) Ammonium persulfate did thin the starch paste produced at the higher temperature.

TABLE IX

| Sample No. | Reaction Temperature (°F.) | NaOH % on Starch Dry Solids | CHPTA % on Starch Dry Solids | Mol Ratio | AP % on Starch Dry Solids | Kjeldahl Nitrogen % Dry Solids Basis | DS | Reaction Efficiency (%) | Paste Dry Solids (%) | Brookfield Viscosity (cp) at 150° F. 50 rpm |
|---|---|---|---|---|---|---|---|---|---|---|
| 1 | 175 | 4.59 | 5.00 | 0.0431 | 0 | 0.2060 | 0.0244 | 57 | 14.40 | 2176 |
| 2 | 300 | 4.61 | 5.00 | 0.0431 | 0 | 0.1127 | 0.0132 | 31 | 12.20 | 129 |
| 3 | 300 | 4.57 | 5.00 | 0.0431 | 0.33 | 0.1190 | 0.0139 | 32 | 13.03 | 73 |

TABLE X

| Sample No. | CHPTA % on Starch Dry Solids | Mol Ratio | AP % on Starch Dry Solids | NaOH % on Starch Dry Solids | Nitrogen Results % Starch dsb | DS | Reaction Efficiency (%) |
|---|---|---|---|---|---|---|---|
| 1 | 0 | 0 | 0 | 4.42 | 0.0310 | | |
| 2 | 4.98 | 0.0429 | 0.55 | 1.11 | 0.0603 | 0.0034 | 8 |
| 3 | 4.98 | 0.0429 | 0.55 | 2.21 | 0.1681 | 0.0161 | 38 |
| 4 | 4.98 | 0.0429 | 0.55 | 4.42 | 0.2670 | 0.0280 | 65 |
| 5 | 4.98 | 0.0429 | 0.55 | 7.75 | 0.2641 | 0.0276 | 64 |
| 6 | 4.98 | 0.0429 | 0.55 | 11.07 | 0.2519 | 0.0262 | 61 |

Results, summarized in Table X, show that under these particular reaction conditions the reaction efficiency reached a maximum at about 4.5% sodium hydroxide on starch dry solids. This is equivalent to about

EXAMPLE X

An aqueous, 23% dry solids slurry of unmodified corn starch was thermal-chemically converted in a steam jet using 0.03% ammonium persulfate (starch dry solids) and the conditions described in Example VIII.

The resultant paste samples were cooled to 180° F. and treated with 3-chloro-2-hydroxypropyltrimethylammonium chloride, ammonium persulfate and varying amounts of sodium hydroxide. After a 30-minute reaction period, the samples were recovered as described in Example IV.

4 mol sodium hydroxide per mole 3-chloro-2-hydroxypropyltrimethylammonium chloride. In practice, the optimum sodium hydroxide use level will depend upon (1) the cationic reagent and (2) ammonium persulfate use levels.

EXAMPLE XI

An aqueous, 23% dry solids slurry of unmodified corn starch was thermal-chemically converted in a steam jet using 0.03% ammonium persulfate (starch dry solids basis) and the conditions described in Example VIII.

The resultant paste samples were cooled to 180° F. and treated with 3-chloro-2-hydroxypropyltrimethylammonium chloride, ammonium persulfate and various bases as described in Table XI. After a 30-minute reaction period the samples were recovered as described in Example IV.

TABLE XI

| Sample No. | Base Type | Base (%) on Starch ds | Equivalent Base Equivalent CHPTA | CHPTA (%) on Starch ds | Mol Ratio | AP (%) on Starch ds | Nitrogen Results % on Starch ds | DS | Reaction Efficiency (%) |
|---|---|---|---|---|---|---|---|---|---|
| 1 | LiOH.H2O | 4.90 | 4.18 | 0 | 0 | 0 | 0.0307 | 0 | 0 |
| 2 | " | 4.90 | 4.18 | 5.26 | 0.0453 | 0 | 0.2904 | 0.0309 | 68 |
| 3 | " | 4.90 | 4.18 | 5.26 | 0.0453 | 0.53 | 0.2915 | 0.0310 | 68 |
| 4 | Ca(OH)2 | 8.25 | 8.37 | 0 | 0 | 0 | 0.0394 | 0 | 0 |
| 5 | " | 4.12 | 4.18 | 5.01 | 0.0431 | 0 | 0.2523 | 0.0252 | 59 |
| 6 | " | 4.12 | 4.18 | 5.01 | 0.0431 | 0.56 | 0.2437 | 0.0242 | 56 |
| 7 | " | 8.25 | 8.37 | 5.01 | 0.0431 | 0 | 0.2704 | 0.0274 | 64 |
| 8 | " | 8.25 | 8.37 | 5.01 | 0.0431 | 0.56 | 0.2579 | 0.0259 | 60 |
| 9 | Na3PO4.12H2O | 42.14 | 12.53 | 0 | 0 | 0 | 0.0357 | 0 | 0 |
| 10 | " | 14.05 | 4.18 | 4.99 | 0.0430 | 0 | 0.1696 | 0.0157 | 37 |
| 11 | " | 14.05 | 4.18 | 4.99 | 0.0430 | 0.55 | 0.1346 | 0.0116 | 27 |
| 12 | " | 42.14 | 12.53 | 4.99 | 0.0430 | 0 | 0.2078 | 0.0203 | 47 |
| 13 | " | 42.14 | 12.53 | 4.99 | 0.0430 | 0.55 | 0.2139 | 0.0210 | 49 |
| 14 | Na2CO3 | 11.64 | 8.35 | 0 | 0 | 0 | 0.0401 | 0 | 0 |
| 15 | " | 5.82 | 4.18 | 4.94 | 0.0426 | 0 | 0.0756 | 0.0041 | 10 |
| 16 | " | 5.82 | 4.18 | 4.94 | 0.0426 | 0.55 | 0.0790 | 0.0045 | 11 |
| 17 | " | 11.64 | 8.35 | 4.94 | 0.0426 | 0 | 0.0755 | 0.0041 | 10 |
| 18 | " | 11.64 | 8.35 | 4.94 | 0.0426 | 0.55 | 0.0736 | 0.0039 | 9 |

TABLE XI-continued

| Sample No. | Base Type | Base (%) on Starch ds | Equivalent Base Equivalent CHPTA | CHPTA (%) on Starch ds | Mol Ratio | AP (%) on Starch ds | Nitrogen Results % on Starch ds | DS | Reaction Efficiency (%) |
|---|---|---|---|---|---|---|---|---|---|
| 19 | Morpholine | 19.80 | 8.52 | 0 | 0 | 0 | 0.1285 | 0 | 0 |
| 20 | " | 9.67 | 4.16 | 5.01 | 0.0432 | 0 | 0.1024 | 0 | 0 |
| 21 | " | 9.67 | 4.16 | 5.01 | 0.0432 | 0.56 | 0.1382 | 0.0011 | 3 |
| 22 | " | 19.42 | 8.36 | 5.01 | 0.0432 | 0 | 0.1862 | 0.0067 | 16 |
| 23 | " | 19.42 | 8.36 | 5.01 | 0.0432 | 0.56 | 0.1794 | 0.0059 | 14 |

Results, summarized in Table XI, show that the use of
(1) Lithium hydroxide or calcium hydroxide gave reaction efficiencies comparable—60 to 70%—to those noted for sodium hydroxide in the previous examples. Doubling the Ca(OH)$_2$ use level resulted in a slight improvement in reaction efficiency.
(2) Trisodium phosphate gave somewhat lower reaction efficiencies—30 to 40%. Tripling the Na$_3$PO$_4$ use level resulted in a significant improvement in reaction efficiencies.
(3) Sodium carbonate or morpholine resulted in relatively poor reaction efficiencies. Doubling the morpholine usage resulted in a significant improvement in efficiency, doubling the Na$_2$CO$_3$ usage had no significant effect.

EXAMPLE XII

An aqueous, 23% solids slurry of unmodified corn starch was thermal-chemically converted in a steam jet using 0.03% ammonium persulfate (starch dry solids basis) and the conditions described in Example VIII.

The resultant paste samples were cooled to 180° F. and treated with sodium hydroxide, 3-chloro-2-hydroxypropyltrimethylammonium chloride and various water soluble persulfates as described in Table XII. After a 30-minute reaction period the samples were recovered as described in Example IV.

TABLE XII

| Sample No. | NaOH % on Starch ds | CHPTA % on Starch ds | Mol Ratio | Persulfate Type | % on Starch ds | Nitrogen Results % on Starch ds | DS | Reaction Efficiency (%) |
|---|---|---|---|---|---|---|---|---|
| 1 | 4.17 | 0 | 0 | — | 0 | 0.0279 | | |
| 2 | 4.17 | 5.21 | 0.0449 | Ammonium | 0.52 | 0.2873 | 0.0309 | 69 |
| 3 | 4.17 | 5.21 | 0.0449 | Sodium | 0.54 | 0.2761 | 0.0295 | 66 |
| 4 | 4.17 | 5.21 | 0.0449 | Potassium | 0.62 | 0.2906 | 0.0313 | 70 |

Results, summarized in Table XII, show that the sodium and potassium persulfate can be substituted for ammonium persulfate with no adverse effect on reaction efficiencies.

EXAMPLE XIII

An aqueous, 23% dry solids slurry of unmodified corn starch was thermal-chemically converted in a steam jet using 0.03% ammonium persulfate (starch dry solids basis) and the conditions described in Example VIII.

The resultant paste samples were cooled to 180° F. in a water bath and then treated with (1) sodium hydroxide, (2) alkaline sodium hypochlorite (NaOCl) and (3) a cationic reagent as described in Table XIII. At the end of a 30-minute reaction period the samples were recovered as described in Example IV.

TABLE XIII

| Sample No. | NaOH % on Starch ds | NaOCl % Active Cl on Starch ds | Cationic Reagent Type | % Active on Starch ds | Nitrogen Results % dsb | DS | Reaction Efficiency (%) | Brookfield Viscosity (cp) at 180° F. 50 rpm |
|---|---|---|---|---|---|---|---|---|
| 1 | 4.16 | 0 | Control | | 0.0299 | — | — | 1284 |
| 2 | 4.16 | 0 | CHPTA | 5.20 | 0.3034 | 0.0326 | 73 | 1352 |
| 3 | 4.14 | 1.58 | Control | | 0.0150 | — | — | 72 |
| 4 | 5.18 | 1.58 | CHPTA | 5.20 | 0.2624 | 0.0294 | 66 | 69 |
| 5 | 4.16 | 0 | Control | | 0.0299 | — | — | 1284 |
| 6 | 4.11 | 0 | CBTC | 5.14 | 0.2714 | 0.0286 | 63 | 2704 |
| 7 | 4.07 | 1.79 | Control | | 0.0114 | — | — | 62 |
| 8 | 5.10 | 1.79 | CBTC | 5.14 | 0.2345 | 0.0264 | 58 | 69 |
| 9 | 4.31 | 0 | Control | | 0.0292 | — | — | 720 |
| 10 | 4.31 | 0 | DEAE | 5.39 | 0.3579 | 0.0392 | 77 | 876 |
| 11 | 2.68 | 1.72 | Control | | 0.0114 | — | — | 56 |
| 12 | 5.20 | 1.72 | DEAE | 5.39 | 0.3322 | 0.0383 | 76 | 49 |

Results, summarized in Table XIII, show that the addition of sodium hypochlorite to the starch (1) 3-chloro-2-hydroxypropyltrimethylammonium chloride, (2) 4-chloro-2-butenyltrimethylammonium chloride or (3) 2-diethylaminoethyl chloride hydrochloride reaction had no significant effect on the cationization reaction efficiency.

EXAMPLE XIV

An aqueous, 23% dry solids slurry of a 25 Buel fluidity corn starch was thermally converted as described in Example VI.

The resultant paste was divided into portions, cooled in a water bath to 180° F. and then treated with sodium hydroxide, a cationic reagent and hydrogen peroxide as described in Table XIV. After a 30-minute reaction period, paste viscosities were determined and the samples recovered as described in Example IV.

TABLE XIV

| Sample No. | NaOH % on Starch ds | Cationic Reagent | | | $H_2O_2$ % Active on Starch ds | Nitrogen Results | | Reaction Efficiency (%) | Brookfield Viscosity (cp) at 150° F. 50 rpm |
|---|---|---|---|---|---|---|---|---|---|
| | | Type | % Starch ds | Mol Ratio | | % dsb | DS | | |
| Control | 4.39 | — | — | — | — | 0.0366 | — | — | 515 |
| 1 | 4.39 | CHPTA | 4.94 | 0.0425 | 0 | 0.2791 | 0.0288 | 68 | 418 |
| 2 | 4.39 | CHPTA | 4.94 | 0.0425 | 0.56 | 0.2093 | 0.0203 | 48 | 261 |
| 3 | 4.39 | CBTC | 5.31 | 0.0468 | 0 | 0.2958 | 0.0308 | 66 | 410 |
| 4 | 4.39 | CBTC | 5.31 | 0.0468 | 0.56 | 0.2165 | 0.0212 | 45 | 377 |

Results, summarized in Table XIV, show that 3-chloro-2-hydroxypropyltrimethylammonium chloride and 4-chloro-2-butenyltrimethylammonium chloride will react with an alkaline starch paste in the presence of hydrogen peroxide. In each case, however, reaction efficiencies were somewhat reduced by the addition of hydrogen peroxide.

EXAMPLE XV

An aqueous, 24% dry solids unmodified corn starch slurry was thermal-chemically converted using the conditions described in Example XI.

The resultant paste was divided into portions, cooled to 180° F. in a water bath and then treated with sodium hydroxide, 2-diethylaminoethyl chloride hydrochloride and hydrogen peroxide as described in Table XV. After a 30-minute reaction period, the samples were recovered as described in Example IV.

TABLE XV

| Sample No. | NaOH % on Starch ds | DEAE % As Is on Starch ds | $H_2O_2$ % Active on Starch ds | Nitrogen Results | | Reaction Efficiency (%) | Brookfield Viscosity (cp) at 180° F. 50 rpm |
|---|---|---|---|---|---|---|---|
| | | | | % dsb | DS | | |
| 1 | 4.12 | 0 | 0 | 0.0293 | — | — | — |
| 2 | 4.21 | 5.26 | 0 | 0.3657 | 0.0401 | 81 | 2444 |
| 3 | 4.21 | 0 | 0.53 | 0.0180 | — | — | 533 |
| 4 | 5.26 | 5.26 | 0.53 | 0.2957 | 0.0329 | 66 | 157 |

2-Diethylaminoethyl chloride hydrochloride does react with an alkaline starch paste in the presence of hydrogen peroxide.

Those modifications and equivalents which fall within the spirit of the invention are to be considered a part thereof.

What is claimed is:

1. A process for preparing thinned starch pastes which comprises substantially simultaneously reacting starch and caustic with a water soluble oxidant and a cationic monomeric halogenated alkyl or alkenyl amine.

2. A process for preparing cationic starch pastes, comprising:
   (1) preparing an aqueous starch slurry wherein the starch is present in a concentration of 3% to 40% by weight,
   (2) heating the starch slurry to paste the starch,
   (3) adding to the pasted starch
       (a) 1 to 15 equivalent weights of an alkali per mole of cationic reagent,
       (b) a water soluble oxidant, and
       (c) a cationic monomeric halogenated alkyl or alkenyl amine,
   (4) reacting said mixture of step (3) at a temperature of 120° to 350° F. for a period of up to two hours.

3. A process according to claim 2 in which there is employed a cationic monomeric halogenated alkyl amine obtained by reacting epichlorohydrin with trimethylamine or a salt thereof, said reaction product being substantially free of residual epichlorohydrin and consisting substantially of 3-chloro-2-hydroxypropyltrimethylammonium chloride.

4. A process according to claim 2 in which 2-diethylaminoethyl chloride hydrochloride is employed.

5. A process according to claim 2 in which 4-chloro-2-butenyltrimethylammonium chloride is employed.

6. A process according to claim 2 in which the starch paste is prepared on a continuous basis in a thermal or thermal-chemical converter using superatmospheric conditions.

7. A process according to claim 2 wherein the starch paste has a solids level of from about 10 to 40% by weight.

8. A process according to claim 2 in which Step (4) is carried out at a temperature of from 120° F. to 200° F.

9. A process according to claim 2 in which an alkali is used in Step (3) in an amount from about 1 to 10 equivalent weights of alkali per mole of cationic halogenated alkyl or alkenyl amine.

10. A process according to claim 2 wherein the water soluble oxidant is a persulfate.

11. A process according to claim 2 wherein the water soluble oxidant is ammonium persulfate.

12. A process according to claim 2 wherein the water soluble oxidant is sodium hypochlorite.

13. A process according to claim 2 wherein the water soluble oxidant is hydrogen peroxide.

14. A process for preparing cationic starch pastes, comprising:
    (1) preparing an aqueous starch slurry containing from about 3% to 40% dry solids,
    (2) treating said starch slurry with
        (a) a cationic monomeric halogenated alkyl or alkenyl amine, and (b) a water soluble oxidant, and (3) heating said starch-cationic reagent-water soluble oxidant mixture to gelatinize the starch and substantially simultaneously with the gelatinization reacting with the said mixture from about 1 to 15 equivalent weights of an alkali per mole of cationic monomeric halogenated alkyl or alkenyl amine at a temperature of from 120° F. to 350° F. for a period of up to two hours.

15. A process according to claim 14 in which there is employed a cationic monomeric halogenated alkyl amine obtained by reacting epichlorohydrin with trimethylamine or a salt thereof, said reaction product being substantially free of residual epichlorohydrin and consisting substantially of 3-chloro-2-hydroxypropyl-trimethylammonium chloride.

16. A process according to claim 14 in which 2-diethylaminoethyl chloride hydrochloride is employed.

17. A process according to claim 14 in which 4-chloro-2-butenyltrimethylammonium chloride is employed.

18. A process according to claim 14 wherein the starch slurry has a solids level of from about 10% to 40% by weight.

19. A process according to claim 14 in which Step (3) is carried out at a temperature of from 120° F. to 200° F.

20. A process according to claim 14 in which an alkali is used in Step (3) in an amount from about 1 to 10 equivalent weights of alkali per mole of said cationic monomeric halogenated alkyl or alkenyl amine.

21. A process according to claim 14 wherein the water soluble oxidant is a persulfate.

22. A process according to claim 14 wherein the water soluble oxidant is sodium hydpochlorite.

23. A process according to claim 14 wherein the water soluble oxidant is hydrogen peroxide.

24. A process according to claim 14 wherein the water soluble oxidant is ammonium persulfate.

* * * * *